United States Patent
Huang et al.

(10) Patent No.: US 9,667,434 B2
(45) Date of Patent: May 30, 2017

(54) INFORMATION TRANSMISSION SYSTEM AND METHOD

(71) Applicant: SONIX Technology Co., Ltd., Chupei, Hsinchu (TW)

(72) Inventors: Kun-Ming Huang, Chupei (TW); Chung-Chih Ko, Hsin Chu County (TW)

(73) Assignee: Sonix Technology Co., Ltd., Chupei, Hsinchu (TW)

( * ) Notice: Subject to any disclaimer, the term of this patent is extended or adjusted under 35 U.S.C. 154(b) by 24 days.

(21) Appl. No.: 14/802,724

(22) Filed: Jul. 17, 2015

(65) Prior Publication Data

US 2016/0294573 A1  Oct. 6, 2016

(30) Foreign Application Priority Data

Apr. 3, 2015  (CN) .......................... 2015 1 0156099

(51) Int. Cl.
*H04L 12/28* (2006.01)
*G08C 23/02* (2006.01)
*G10L 19/018* (2013.01)

(52) U.S. Cl.
CPC .......... *H04L 12/2807* (2013.01); *G08C 23/02* (2013.01); *G10L 19/018* (2013.01); *H04L 2012/2841* (2013.01)

(58) Field of Classification Search
CPC ...... G08B 1/08; G08B 21/24; G08B 13/1472; G08B 17/00; G08B 21/023; G08B 21/0288; G08B 25/016; G08B 29/185; G08B 7/064

USPC ......................................................... 367/199
See application file for complete search history.

(56) References Cited

U.S. PATENT DOCUMENTS

| | | | |
|---|---|---|---|
| 7,899,915 B2* | 3/2011 | Reisman | G06F 17/30873 709/227 |
| 8,768,313 B2* | 7/2014 | Rodriguez | G06K 9/00986 382/118 |
| 8,929,877 B2* | 1/2015 | Rhoads | G06F 17/30241 455/420 |
| 9,183,580 B2* | 11/2015 | Rhoads | G06Q 30/06 |
| 9,240,021 B2* | 1/2016 | Rodriguez | G06Q 30/06 |
| 2008/0088602 A1 | 4/2008 | Hotelling | |

* cited by examiner

*Primary Examiner* — Mark Blouin
(74) *Attorney, Agent, or Firm* — Muncy, Geissler, Olds & Lowe, P.C.

(57) ABSTRACT

An information transmission system includes a mobile device, a signal transmission line and an internet device with networking capabilities. The mobile device includes a user interface, an encoder, a modulator and an audio connector. The user interface receives network setting information, and the encoder is coupled to the user interface to encodes the network setting information into information codes. The modulator is coupled to the encoder to modulate the information codes to form an audio signal embedded with the information codes. The audio connector is coupled to the modulator, and the signal transmission line is connected to the audio connector of the mobile device to transmit the audio signal embedded with the information codes. The internet device is connected to the signal transmission line, receives the audio signal with the embedded information codes, and decodes the information codes into the network setting information.

19 Claims, 4 Drawing Sheets

INFORMATION TRANSMISSION SYSTEM AND METHOD

BACKGROUND a. Field of the Invention

The invention relates generally to an information transmission system and method, and more particularly to an information transmission system and method for transmitting network setting information in the Internet of Things (IOT).

b. Description of the Related Art

There exist today many types of electronic devices with networking capabilities such as a smoke alarm, a self-adjusting thermostat, an IP camera, etc. A user may remotely control these devices using applications or web pages. However, these devices are not always equipped with a user interface, and, without the user interface, they are specifically designed to transmit network setting information such as service set identifiers (SSID) and passwords input by a user to realize network setting. For example, in conventional designs, information is transmitted through wire transmission and wireless transmission. The wire transmission may be realized using, for example, a USB or an Ethernet interface, and the wireless transmission may be realized using quick response (QR) codes, ultrasonic tone signals, or wireless local area network (WLAN; IEEE 802.11) to transmit network setting information. However, a growing trend for notebooks is to omit an Ethernet interface, and a mobile device such as a smart phone does not necessarily have a USB port. Therefore, the wire data transmission using a USB port or an Ethernet interface is not suitable for various kinds of mobile devices. Moreover, the network setting based on quick response (QR) codes requires accurate focusing processes and is only suitable for an internet device serving image capturing functions, and the network setting based on ultrasonic tone signals is significantly affected by noisy environment. Further, a conventional internet device may be simulated as a wireless access point in a wireless local area network using network software to achieve network setting. In that case, however, the internet device needs to switch between a host mode and a client mode to increase the setting time and the probability of setting failure.

BRIEF SUMMARY OF THE INVENTION

The invention provides an information transmission system and method capable of resolving problems of conventional designs.

In order to achieve one or a portion of or all of the objects or other objects, one embodiment of the invention provides an information transmission system including a mobile device, a signal transmission line and an internet device with networking capabilities. The mobile device includes a user interface, an encoder, a modulator and an audio connector. The user interface receives network setting information, and the encoder is coupled to the user interface to encodes the network setting information into information codes. The modulator is coupled to the encoder to modulate the information codes to form an audio signal embedded with the information codes. The audio connector is coupled to the modulator to receive the audio signal embedded with the information codes. The signal transmission line is connected to the audio connector of the mobile device to transmit the audio signal embedded with the information codes. The internet device is connected to the signal transmission line, receives the audio signal with the embedded information codes, and decodes the information codes into the network setting information.

In one embodiment, the information codes are embedded in the audio signal using frequency modulation or amplitude modulation, and the signal transmission line may be an audio line.

In one embodiment, the information codes are in the form of ASCII codes, and the network setting information includes a service set identifier and a password.

In one embodiment, the mobile device may be a smart phone or a tablet computer. The internet device may be an electronic device capable of being linked to a wireless local area network, such as a smoke alarm, an automatic temperature regulator, an IP camera, or a wearable electronic device.

In one embodiment, the internet device includes an information processor and a decoder, the decoder decodes the information codes to get the network setting information, and the information processor executes the network setting for the internet device according to the network setting information.

In one embodiment, the information processor links the internet device to a wireless access point according to the network setting information.

The invention relates, in another embodiment, to a method for transmitting network setting information. The method includes encoding network setting information input via a mobile device into information codes, modulating the information codes to form an audio signal embedded with the information codes, transmitting the audio signal embedded with the information codes to an internet device with networking capabilities, and decoding the information codes to provide the internet device with the network setting information.

The invention relates, in another embodiment, to a method for transmitting network setting information for use with an internet device linked to a wireless local area network device. The method includes using the internet device to receive an audio signal embedded with information codes, and decoding the information codes embedded in the audio signal to allow the internet device to link the wireless local area network device according to the information codes.

According to the above embodiments, because it is very common for a mobile device to have an audio input/output port, the mobile device is allowed to transmit an audio signal carrying network setting information to an internet device when a signal transmission line is connected between the audio input/output port and the internet device. Therefore, the network setting for the internet device is easily achieved even the mobile device does not have a USB port. This network configuration based on an audio signal carrying network setting information is beneficial to reduce setting time and costs. Besides, the process of encoding information and embedding codes in an audio signal is simple, and the wire data transmission relying on a signal transmission line is highly reliable to reduce the probability of setting failure. In conventional deigns, the network setting based on quick response (QR) code requires accurate focusing processes and is only suitable for an internet device serving image capturing functions, and the network setting based on ultrasonic tone signals is significantly affected by noisy environment. Further, a conventional internet device may be simulated as a wireless access point in a wireless local area network using network software to achieve network setting. In that case, however, the internet device needs to switch between a host mode and a client mode to increase the setting time and the probability of setting failure. The embodiments of the invention may resolve the problems of conventional designs and are beneficial to fast setting, low costs and low failure rates.

Various embodiments of an information transmission system and method are discussed below with reference to FIGS. 1-4. However, those skilled in the art will appreciate that the detailed description given herein with respect to these figures is exemplary and not exhaustive and that many variations on these embodiments are possible.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
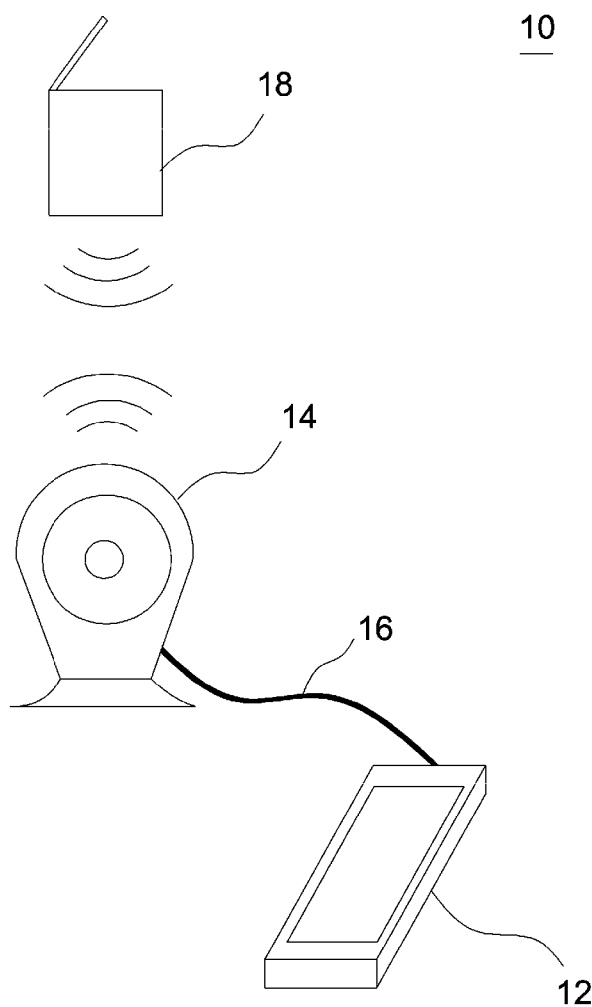
FIG. 1 is a schematic diagram of an information transmission system according to an embodiment of the invention.
Figure 2:
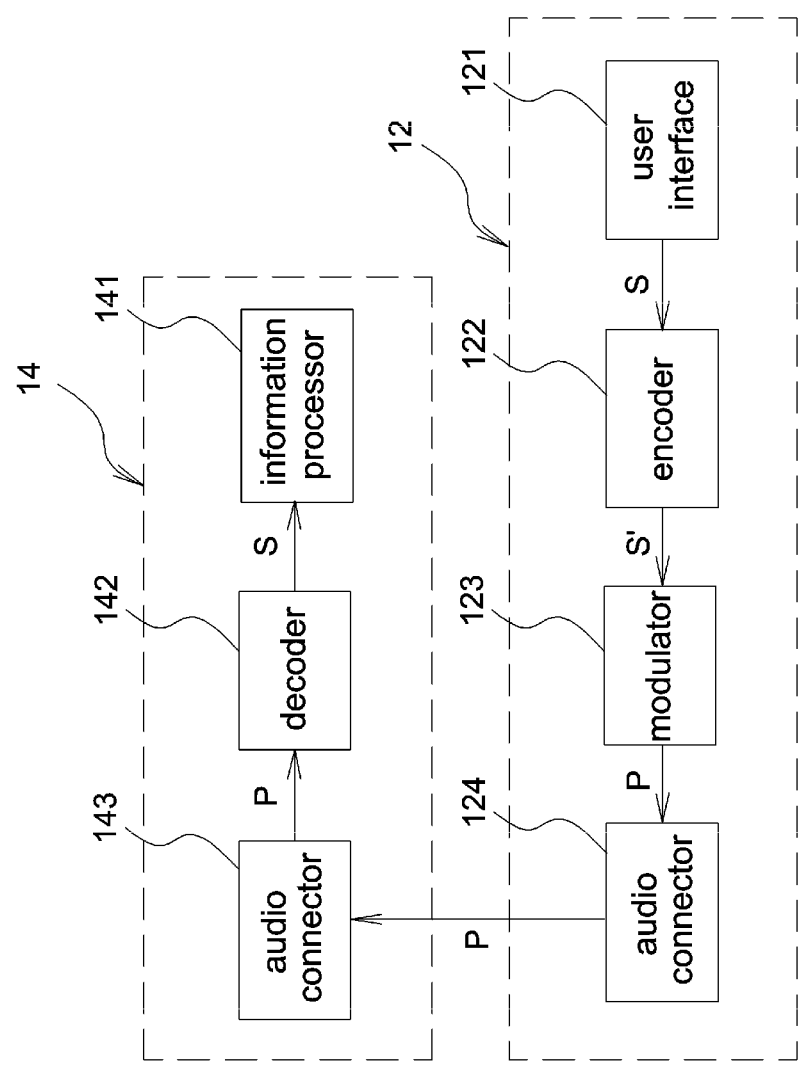
FIG. 2 is a block diagram illustrating various components of an information transmission system according to an embodiment of the invention.

FIG. 1 is a schematic diagram of an information transmission system according to an embodiment of the invention. FIG. 2 is a block diagram illustrating various components of an information transmission system according to an embodiment of the invention. As illustrated in FIG. 1, the information transmission system 10 may include a mobile device 12 and an internet device 14. The mobile device 12 and the internet device 14 are connected to each other by an audio line 16. The mobile device 12 may include, for example, a portable electronic device such as a smart phone or a tablet computer. The internet device 14 may be an electronic device capable of executing communication protocols. For example, the internet device 14 may be an electronic device with networking capabilities such as a smoke alarm, an automatic temperature regulator, an IP camera, a wearable electronic device, etc. In one embodiment, various kinds of information such as battery life of the internet device 14, ambient temperature, abnormal detected conditions, and video/audio streams is transmitted to the mobile device 12 through, for example, a wireless access point (wireless AP) 18, a wireless router and internet. Further, a user may use an electronic device (not shown) such as a desktop computer, a notebook, a mobile phone or a tablet computer to remotely control or retrieve information from the internet device 14.

Figure 3A:
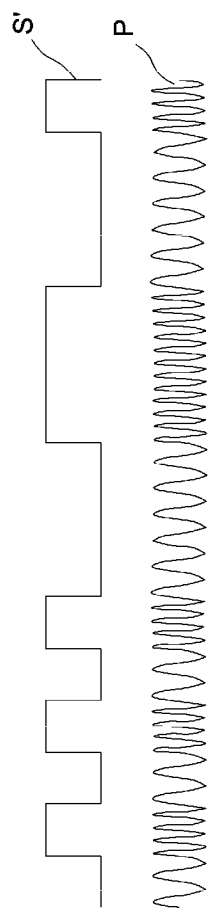
FIG. 3A illustrates an embodiment of forming a frequency-modulated audio signal embedded with information codes.
Figure 3B:
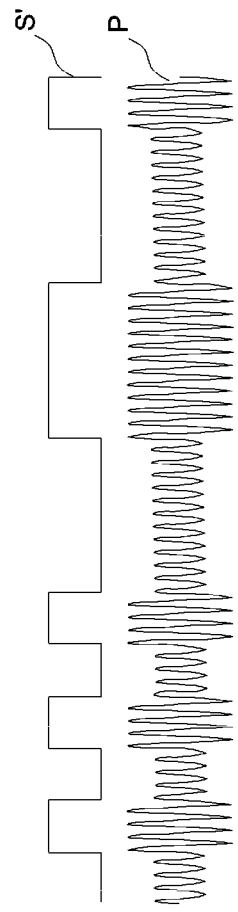
FIG. 3B illustrates an embodiment of forming an amplitude-modulated audio signal embedded with information codes.

As shown in FIG. 2, in this embodiment, the mobile device 12 may include a user interface 121, an encoder 122, a modulator 123, and an audio connector 124. The user interface 121 may receive network setting information S input by a user. For example, the user may input network setting information S such as a service set identifier (SSID) of the wireless access point 18, a service set identifier of the wireless router in a wireless local area network (WLAN) and a password to the mobile device 12 through the user interface 121. The encoder 122 is coupled to the user interface 121 to encode the network setting information S into information codes S', and the information codes S' is modulated by the modulator 123 using frequency modulation (FM) or amplitude modulation (AM) to form an audio signal P embedded with the information codes S'. For example, the network setting information S may be converted into information codes S' in the form of ASCII codes using ASCII representations for the input characters. Then, the information codes S' is modulated using frequency modulation (FM) or amplitude modulation (AM) to form an audio signal P embedded with the information codes S'. For example, FIG. 3A illustrates an embodiment of forming a frequency-modulated audio signal P embedded with information codes S', and FIG. 3B illustrates an embodiment of forming an amplitude-modulated audio signal P embedded with information codes S'. The audio signal P embedded with information codes S' is output to an audio line 16 via the audio connector 124. The internet device 14 is connected to the audio line 16 to receive the audio signal P embedded with information codes S' via the audio line 16. The internet device 14 may include an information processor 141, a decoder 142 and an audio connector 143. The audio signal P embedded with information codes S' is transmitted to the audio connector 143 of the internet device 14 via the audio line 16 and then decoded by the decoder 142 to get the network setting information S.

Note it is merely an example that the internet device 14 receives the audio signal P embedded with information codes S' via the audio connector 143 and the audio line 16. This example is not intended to limit the scope of the claims. In an alternate embodiment, the internet device 14 may receive the audio signal P via another signal receptacle or interface, and, except for the audio line, the audio signal P may be sent to the internet device 14 through other kind of signal transmission line. The information processor 141 may execute the network setting for the internet device 14 according to the network setting information S. For example, the information processor 141 may link the internet device 14 to the wireless access point 18 according to the network setting information S.

According to the above embodiments, because it is very common for a mobile device to have an audio input/output port, the mobile device is allowed to transmit an audio signal carrying network setting information to an internet device when a signal transmission line is connected between the audio input/output port and the internet device. Therefore, the network setting for the internet device is easily achieved even the mobile device does not have a USB port. This network configuration based on an audio signal carrying network setting information is beneficial to reduce setting time and costs. Besides, the process of encoding information and embedding codes in an audio signal is simple, and the wire data transmission relying on a signal transmission line is highly reliable to reduce the probability of setting failure. In conventional deigns, the network setting based on quick response (QR) code requires accurate focusing processes and is only suitable for an internet device serving image capturing functions, and the network setting based on ultrasonic tone signals is significantly affected by noisy environment. Further, a conventional internet device may be simulated as a wireless access point in a wireless local area network using network software to achieve network setting. In that case, however, the internet device needs to switch between a host mode and a client mode to increase the setting time and the probability of setting failure. The embodiments of the invention may resolve the problems of conventional designs and are beneficial to fast setting, low costs and low failure rates.

Figure 4:
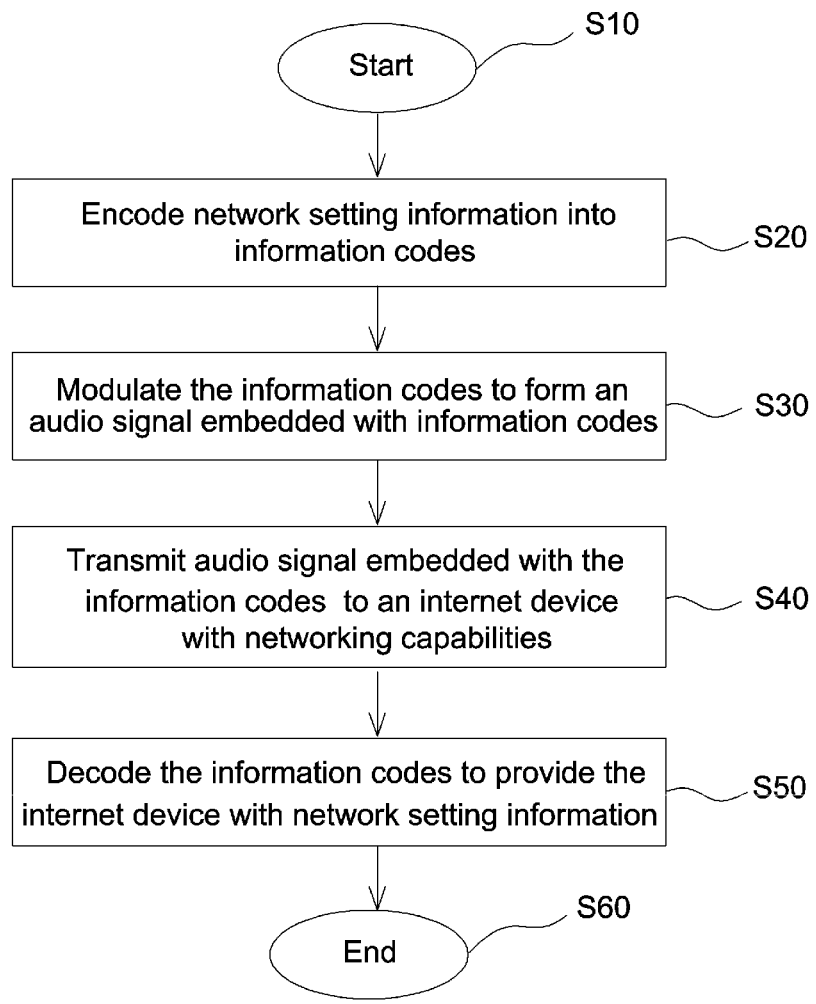
FIG. 4 shows a flowchart illustrating a method for transmitting network setting information according to an embodiment of the invention.

FIG. 4 shows a flowchart illustrating a method for transmitting network setting information according to an embodiment of the invention. As shown in FIG. 4, first, network setting information that may be input via a user interface is encoded into information codes (Step S20), and the information codes are modulated to form an audio signal embedded with the information codes (Step S30). Further, the audio signal embedded with the information codes may be transmitted to an internet device with networking capabilities (Step S40), and the information codes may be decoded to provide the internet device with the network setting information (Step S50). The internet device may be linked to a wireless access point according to the network setting information. The internet device may be an electronic device capable of being linked to a wireless local area network (WLAN), such as a smoke alarm, an automatic temperature regulator, an IP camera, a wearable electronic device, etc.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An information transmission system, comprising:
a mobile device, comprising:
a user interface for receiving network setting information;
an encoder coupled to the user interface to encodes the network setting information into information codes;
a modulator coupled to the encoder to modulate the information codes to form an audio signal embedded with the information codes; and
an audio connector coupled to the modulator to receive the audio signal embedded with the information codes;
a signal transmission line connected to the audio connector of the mobile device to transmit the audio signal embedded with the information codes; and
an internet device with networking capabilities connected to the signal transmission line, the internet device receiving the audio signal with the embedded information codes and decoding the information codes into the network setting information.

2. The information transmission system as claimed in claim 1, wherein the information codes are embedded in the audio signal using frequency modulation or amplitude modulation.

3. The information transmission system as claimed in claim 1, wherein the information codes are in the form of ASCII codes.

4. The information transmission system as claimed in claim 1, wherein the network setting information comprises a service set identifier and a password.

5. The information transmission system as claimed in claim 1, wherein the mobile device is a smart phone or a tablet computer.

6. The information transmission system as claimed in claim 1, wherein the internet device is an electronic device capable of being linked to a wireless local area network.

7. The information transmission system as claimed in claim 6, wherein the internet device is a smoke alarm, an automatic temperature regulator, an IP camera, or a wearable electronic device.

8. The information transmission system as claimed in claim 1, wherein the internet device comprises an information processor and a decoder, the decoder decodes the information codes to get the network setting information, and the information processor executes the network setting for the internet device according to the network setting information.

9. The information transmission system as claimed in claim 8, wherein the information processor links the internet device to a wireless access point according to the network setting information.

10. The information transmission system as claimed in claim 1, wherein the signal transmission line is an audio line.

11. A method for transmitting network setting information, comprising:
    encoding network setting information input via a mobile device into information codes;
    modulating the information codes to form an audio signal embedded with the information codes;
    transmitting the audio signal embedded with the information codes to an internet device with networking capabilities; and
    decoding the information codes to provide the internet device with the network setting information.

12. The method as claimed in claim 11, further comprising:
    linking the internet device to a wireless access point according to the network setting information.

13. The method as claimed in claim 11, wherein the internet device is an electronic device capable of being linked to a wireless local area network.

14. A method for transmitting network setting information for use with an internet device linked to a wireless local area network device, the method comprising the following steps:
    using the internet device to receive an audio signal embedded with information codes; and
    decoding the information codes embedded in the audio signal to allow the internet device to link the wireless local area network device according to the information codes.

15. The method as claimed in claim 14, further comprising:
    encoding network setting information input by an user into the information codes.

16. The method as claimed in claim 15, wherein the network setting information comprises a service set identifier and a password.

17. The method as claimed in claim 14, further comprising:
    transmitting the audio signal embedded with the information codes from a mobile device to the internet device.

18. The method as claimed in claim 17, wherein the mobile device is a smart phone or a tablet computer.

19. The method as claimed in claim 14, wherein the information codes are embedded in the audio signal using frequency modulation of amplitude modulation.

* * * * *